(12) United States Patent
Beddoe et al.

(10) Patent No.: US 8,074,097 B2
(45) Date of Patent: Dec. 6, 2011

(54) META-INSTRUMENTATION FOR SECURITY ANALYSIS

(75) Inventors: Marshall A. Beddoe, San Francisco, CA (US); Thomas A. Maufer, Menlo Park, CA (US)

(73) Assignee: MU Dynamics, Inc., Sunnyvale, CA (US)

( * ) Notice: Subject to any disclaimer, the term of this patent is extended or adjusted under 35 U.S.C. 154(b) by 0 days.

(21) Appl. No.: 12/844,405

(22) Filed: Jul. 27, 2010

(65) Prior Publication Data

US 2010/0293415 A1    Nov. 18, 2010

Related U.S. Application Data

(63) Continuation of application No. 11/850,164, filed on Sep. 5, 2007, now Pat. No. 7,774,637.

(51) Int. Cl.
*G06F 11/00* (2006.01)
(52) U.S. Cl. ............ 714/4.1; 714/25; 714/38.1; 714/39; 726/22; 726/25
(58) Field of Classification Search ............... 714/4, 25, 714/38, 4.1, 38.1, 39; 726/22, 25
See application file for complete search history.

(56) References Cited

U.S. PATENT DOCUMENTS

| | | | |
|---|---|---|---|
| 5,067,104 A | 11/1991 | Krishnakumar et al. | |
| 5,459,837 A | 10/1995 | Caccavale | |
| 5,485,409 A | 1/1996 | Gupta et al. | |
| 5,892,903 A | 4/1999 | Klaus | |
| 6,088,804 A | 7/2000 | Hill et al. | |
| 6,324,656 B1 | 11/2001 | Gleichauf et al. | |
| 6,363,477 B1 | 3/2002 | Fletcher et al. | |
| 6,574,737 B1 | 6/2003 | Kingsford et al. | |
| 6,584,569 B2 | 6/2003 | Reshef et al. | |
| 6,609,205 B1 | 8/2003 | Bernhard et al. | |
| 6,654,914 B1 | 11/2003 | Kaffine et al. | |
| 6,952,779 B1 | 10/2005 | Cohen et al. | |
| 7,152,105 B2 | 12/2006 | McClure et al. | |
| 7,159,151 B2 * | 1/2007 | Morgan et al. | 714/43 |
| 7,178,166 B1 | 2/2007 | Taylor et al. | |
| 7,185,232 B1 | 2/2007 | Leavy et al. | |
| 7,243,148 B2 | 7/2007 | Keir et al. | |
| 7,257,630 B2 | 8/2007 | Cole et al. | |

(Continued)

FOREIGN PATENT DOCUMENTS

WO    2006/099536    9/2006

OTHER PUBLICATIONS

U.S. Appl. No. 11/760,600, filed Jun. 8, 2007.

(Continued)

*Primary Examiner* — Charles Ehne
(74) *Attorney, Agent, or Firm* — K&L Gates LLP

(57) ABSTRACT

A system and method for analyzing and/or testing member devices in a multi-device system. The multi-device system includes a device-under-analysis (DUA) and a device-under-observation (DUO). An analyzer that is external to the multi-device system generates and sends test messages to the DUA. The analyzer monitors the health of the multi-device system through the DUO and detects a system-wide impact of the DUA caused by the test messages. The analyzer analyzes the DUA based on the test messages and the system-wide impact.

20 Claims, 2 Drawing Sheets

U.S. PATENT DOCUMENTS

| | | | |
|---|---|---|---|
| 7,272,650 | B2 | 9/2007 | Elgebaly et al. |
| 7,290,145 | B2 | 10/2007 | Falkenthros |
| 7,315,801 | B1 | 1/2008 | Dowd et al. |
| 7,342,892 | B2 | 3/2008 | Soon et al. |
| 7,346,922 | B2 | 3/2008 | Miliefsky |
| 7,421,621 | B1* | 9/2008 | Zambrana ........................ 714/38 |
| 7,447,966 | B2 | 11/2008 | Kamannavar et al. |
| 7,451,488 | B2 | 11/2008 | Cooper et al. |
| 7,471,999 | B2 | 12/2008 | Taki |
| 7,509,675 | B2 | 3/2009 | Aaron |
| 7,512,125 | B2 | 3/2009 | Betts et al. |
| 7,536,456 | B2 | 5/2009 | Williams et al. |
| 7,536,605 | B2 | 5/2009 | Keaffaber et al. |
| 7,543,056 | B2 | 6/2009 | McClure et al. |
| 7,607,170 | B2 | 10/2009 | Chesla |
| 7,624,422 | B2 | 11/2009 | Williams et al. |
| 7,627,891 | B2 | 12/2009 | Williams et al. |
| 7,627,900 | B1 | 12/2009 | Noel et al. |
| 7,664,845 | B2 | 2/2010 | Kurtz et al. |
| 7,673,043 | B2 | 3/2010 | Keir et al. |
| 7,774,637 | B1 | 8/2010 | Beddoe et al. |
| 7,954,161 | B1 | 5/2011 | Guruswamy et al. |
| 7,958,230 | B2 | 6/2011 | Guruswamy et al. |
| 7,958,560 | B1 | 6/2011 | Guruswamy |
| 2001/0034847 | A1 | 10/2001 | Gaul, Jr. |
| 2002/0157041 | A1 | 10/2002 | Bennett et al. |
| 2003/0051163 | A1 | 3/2003 | Bidaud |
| 2003/0154399 | A1 | 8/2003 | Zuk et al. |
| 2003/0159063 | A1 | 8/2003 | Apfelbaum et al. |
| 2004/0001443 | A1 | 1/2004 | Soon et al. |
| 2004/0068586 | A1 | 4/2004 | Xie et al. |
| 2004/0068675 | A1* | 4/2004 | Liu ................................ 714/27 |
| 2004/0103315 | A1 | 5/2004 | Cooper et al. |
| 2004/0205557 | A1 | 10/2004 | Bahrs et al. |
| 2004/0230881 | A1 | 11/2004 | Gwak |
| 2005/0015213 | A1 | 1/2005 | Somervill et al. |
| 2005/0044418 | A1 | 2/2005 | Miliefsky |
| 2005/0135391 | A1 | 6/2005 | Sung |
| 2005/0144137 | A1 | 6/2005 | Kumar et al. |
| 2005/0195820 | A1 | 9/2005 | Betts et al. |
| 2005/0248457 | A1 | 11/2005 | Himberger et al. |
| 2005/0273772 | A1 | 12/2005 | Matsakis et al. |
| 2005/0273854 | A1 | 12/2005 | Chess et al. |
| 2005/0273859 | A1 | 12/2005 | Chess et al. |
| 2006/0005231 | A1 | 1/2006 | Zuk et al. |
| 2006/0015941 | A1 | 1/2006 | McKenna |
| 2006/0015943 | A1 | 1/2006 | Mahieu |
| 2006/0021034 | A1 | 1/2006 | Cook |
| 2006/0021044 | A1 | 1/2006 | Cook |
| 2006/0021045 | A1 | 1/2006 | Cook |
| 2006/0021046 | A1 | 1/2006 | Cook |
| 2006/0021047 | A1 | 1/2006 | Cook |
| 2006/0021048 | A1 | 1/2006 | Cook et al. |
| 2006/0021049 | A1 | 1/2006 | Cook |
| 2006/0036755 | A1 | 2/2006 | Abdullah et al. |
| 2006/0080733 | A1* | 4/2006 | Khosmood et al. ............. 726/13 |
| 2006/0085723 | A1 | 4/2006 | Bartz et al. |
| 2006/0098579 | A1 | 5/2006 | Chang et al. |
| 2006/0106939 | A1 | 5/2006 | Cha et al. |
| 2006/0137009 | A1 | 6/2006 | Chesla |
| 2006/0277606 | A1 | 12/2006 | Yunus et al. |
| 2007/0006037 | A1* | 1/2007 | Sargusingh et al. ............ 714/38 |
| 2007/0011319 | A1 | 1/2007 | McClure et al. |
| 2007/0086389 | A1 | 4/2007 | Park et al. |
| 2007/0094728 | A1 | 4/2007 | Julisch et al. |
| 2007/0115962 | A1 | 5/2007 | Mammoliti et al. |
| 2007/0174917 | A1* | 7/2007 | Guruswamy .................... 726/25 |
| 2007/0204347 | A1 | 8/2007 | Caceres et al. |
| 2008/0005555 | A1 | 1/2008 | Lotem et al. |
| 2008/0072322 | A1* | 3/2008 | Guruswamy .................... 726/22 |
| 2008/0092237 | A1 | 4/2008 | Yoon et al. |
| 2008/0098479 | A1 | 4/2008 | O'Rourke et al. |
| 2008/0120283 | A1 | 5/2008 | Liu et al. |
| 2008/0155338 | A1* | 6/2008 | Rusmanov ...................... 714/38 |
| 2008/0282352 | A1 | 11/2008 | Beddoe et al. |
| 2009/0083854 | A1 | 3/2009 | Bozanich et al. |
| 2009/0271863 | A1* | 10/2009 | Govindavajhala et al. ..... 726/23 |
| 2009/0320137 | A1 | 12/2009 | White et al. |
| 2009/0328190 | A1 | 12/2009 | Liu et al. |
| 2010/0106742 | A1 | 4/2010 | Guruswamy et al. |
| 2010/0284282 | A1 | 11/2010 | Golic |
| 2010/0284283 | A1 | 11/2010 | Golic et al. |
| 2010/0293415 | A1 | 11/2010 | Beddoe et al. |

OTHER PUBLICATIONS

U.S. Appl. No. 11/696,605, filed Apr. 4, 2007.

U.S. Appl. No. 11/351,403, filed Jun. 10, 2006.

Wagner, D. et al., "Intrusion Detection Via Static Analysis", IEEE Symposium on Security and Privacy, 2001, pp. 156-168.

Finlay, I. et al., "Multiple Vulnerabilities in Many Implementations of the Simple Network Management Protocol (SNMP)", Cert® Advisory CA-2002-03, Pittsburgh, PA, US.

Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.

Kaksonen, R., "A Functional Method for Assessing Protocol Implementation Security", VTT Publications 448, 2011, 128 p.+app. 15p., Technical Research Centre of Finland, FI.

Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.

Miller, B. et al., "Fuzz Revisited: A Re-examination of the Reliabiltiy of Unix Utilities and Services", Computer Sciences Department, Oct. 1995, pp. 1-23, Madison, Wisconsin, US.

PROTOS Test-Suite: c06-snmpv1, University of Oulu (ee.oulu.fi)— http://www.ee.oulu.fi/research/ouspg/protos/testing/c06/snmpv1/index, Oct. 17, 2002, pp. 1-26, Finland.

PROTOS Test-Suite: c06-ldapv3, University of Oulu (ee.oulu.fi)— http://www.ee.oulu.fi/research/ouspg/protos/testing/c06/ldapv3/index.html, Dec. 2001, p. 1-13, Finland.

Beddoe, M., "Network Protocol Analysis using Bioinformatics Algorithms", 2004, retrieved on May 17, 2007, from <URL: http://www.4tphi.net/~awalters/PI/pi.pdf>.

Case, J. et al., "A Simple Network Management Protocol (SNMP)" (RFC 1157), May 1990, retrieved on May 17, 2007, from <URL: http://www.faqs.org/rfcs/rfc1157.html>.

Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.

McCloghrie K. et al., "Structure of Management Information Version 2 (SMIv2)" (RFC 2578), Apr. 1999, retrieved on May 17, 2007, from <URL: http://www.faqs.org/rfcs/rfc2578.html>.

Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL: http://arxiv.org/abs/cs/9709102>.

Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL: http://postqueensu.ca/~trd/research/papers/FinalPST04.pdf>.

Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL: http://post.queensu.ca/~trd/research/papers/MILCOM.pdf>.

Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.queensu.ca/~trd/research/papers/zhangState.pdf>.

Zhang, S. et al., "Applying Software Transformation Techniques to Security Testing", Proceedings: Software Technology and Engineering in Practice (STEP), Toronto, Canada, Oct. 2005, retrieved on May 17, 2007, from <URL: http://post.queensu.ca/~trd/research/papers/step2005.pdf>.

Aitel, D., "An Introduction to SPIKE, the Fuzzer Creation Kit" (presentation slides), Aug. 1, 2002, Black Hat USA, Las Vegas, NV, online, retrieved Jun. 26, 2007, from <URL: https://www.blackhat.com/presentations/bh-usa-02/bh-us-02-aitel-spike.ppt>.

Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.

Beddoe, M., "The Protocol Informatics Project: Automating Network Protocol Analysis" (presentation slides), 2005.

Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.

Beizer, B., "Chapter 9: Syntax Testing", in Software Testing Techniques, 2nd Ed., 1990, pp. 284-319, Van Nostrand Reinhold, New York, NY.

Beizer, B., "Chapter 8: Syntax Testing", in Black-Box Testing: Techniques for Functional Testing of Software and Systems, 1995, pp. 177-201, John Wiley & Sons, Inc., New York, NY.

Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.

Mu Security, "6 Degrees of Protocols", 2006.

Mu Security, "Protocol Vulnerability Patterns", Apr. 2006.

Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.

Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntax%20Testing.ppt>.

Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.

Bellovin, S. "A Technique for Counting NATted Hosts", Proceedings: Second Internet Measurement Workshop (IMW), Marseille, France, Nov. 6-8, 2002, pp. 267-272.

Bradner, S. et al., "Benchmarking Methodology for Network Interconnect Devices (RFC_1944)", May 1996, online, retrieved on May 12, 2006, from <URL: http://rfc.net/rfc1944.html>.

Bradner, S. et al., Benchmarking Methodology for Network Interconnect Devices (RFC_2544), Mar. 1999, online, retrieved on May 12, 2006, from <URL: http://rfc.net/rfc2544.html>.

Cisco Systems, Inc., "Mobile IP—NAT Detect" in "Cisco IOS IP Mobility Configuration Guide, Release 12.4.", 2005, online, retrieved on May 12, 2006, from <URL: http://www.cisco.com/univercd/cc/td/doc/product/software/ios124/124cg/himo_c/ch05/hnatray.pdf>.

Dunn, J. et. al., "Methodology for ATM Benchmarking (RFC 3116)", Jun. 2011, online, retrieved on May 12, 2006, from <URL: http://rfc.net/rfc3116.html>.

Egevang, K., et al., "The IP Network Address Translator (NAT) (RFC 1631)", May 1994, online, retrieved on May 12, 2006, from <URL: http://rfc.net/rfc3116.html>.

Microsoft Corp., "Overview of Network Address Translation (NAT) in Windows XP", Sep. 12, 2005, online, retrieved on May 12, 2006, from <Url: http://www.microsoft.com/technet/prodtechnol/winxppro/deploy/nattrnsw.mspx?pd=true>.

Netcom Systems, "SmartWindow User Guide Version 6 53", Document No. 340-1020-001 REV C, Dec. 1999, online, retrieved on May 12, 2006, from <URL: https://www.cobra.ee.ntu.edu.tw/~oops/HTML6/08_exp/smartbit%20reading.pdf>.

Nikolic, M., "Performance Measurements of Multimedia Transmissions in IP over ATM Networks", Master's Thesis, School of Engineering Science, Simon Fraser University, Dec. 2002, online, retrieved on May 12, 2006, from <URL: http://142.58.111.30/~ljilja/cnl/pdf/milan.pdf>.

Sorensen, S., "Intrusion Detection and Prevention Protecting Your Network from Attacks", Document No. 200065-002, 2006, online, retrieved on May 12, 2006, from <URL: http://www.juniper.net/solutions/literature/white_papers/200065.pdf>.

Srisuresh, P. et al., "IP Network Address Translator (NAT) Terminology and Considerations (RFC 2663)", Aug. 1999, online, retrieved on May 12, 2006, from <URL: http://rfc/net/rfc2663.html>.

Srisuresh, P. et al., "Traditional IP Network Address Translator (Traditional NAT) (RFC 3022)", Jan. 2001, online, retrieved on May 12, 2006, from <URL: http://rfc.net/rfc3022.html>.

Trend Communications, "RFC 2544 Testing with Aurora Tango", date unknown, online, retrieved on May 12, 2006, from <URL: http://www.trendtest.co.uk/trendweb/resource.nsf/vIFileURL-Lookup/en%5E%5ERFC+2544+testing/$FILE/GbEnet.2544.test.pdf>.

Udupa, R. et al., "Performance Issues and Evaluation Techniques for Networking Devices", 2001, online, retrieved on May 12, 2006, from URL: http://softwaredioxide.com/Channels/events/testing2001/Presentations/raghavendra_infosys.pdf>.

PCT International Search Report and Written Opinion, PCT/US06/09512, Aug. 31, 2006.

Wikipedia.com, Active Directory, http://en.wikipedia.org/wiki/Tunneling_protocol.

Wikipedia.com, Active Directory, http://en.wikipedia.org/wiki/Session_initiation.

Gordano.com, What is the SMTP/EHLO clause.

U.S. Appl. No. 11/514,809, filed on Sep. 1, 2006.
U.S. Appl. No. 11/859,691, filed on Sep. 21, 2007.
U.S. Appl. No. 11/351,402, filed on Feb. 10, 2006.
U.S. Appl. No. 13/153,797, filed on Jun. 6, 2011.
U.S. Appl. No. 13/154,636, filed on Jun. 7, 2011.

* cited by examiner

META-INSTRUMENTATION FOR SECURITY ANALYSIS

BACKGROUND

The present invention relates to automated analysis and testing of hardware and/or software.

A software application or hardware device (collectively called a target device or a device-under-analysis) can be analyzed or tested in an automated way by using a second device called an analyzer. In this situation, the analyzer generates a test message (e.g., an invalid test message), delivers the test message to the target device, monitors the target device, and/or analyzes the monitored information to determine whether the target device is operating correctly. Analyses and test messages identify the limitations of a target device.

The analyzer can determine whether a target device was designed and implemented correctly by delivering various test messages to the target device and observing and analyzing its responses to the tests. For example, security analysis can be performed as described in U.S. Utility patent application Ser. No. 11/351,403, filed on Feb. 10, 2006, the disclosure of which is hereby incorporated by reference in its entirety. The various tests may include valid test messages (called instrumentation vectors) to determine whether the device is still responding appropriately. For example, the analyzer can identify and characterize failures in a target device based on its responses to instrumentation vectors as described in U.S. Utility patent application Ser. No. 11/760,600, filed on Jun. 8, 2007, the disclosure of which is hereby incorporated by reference in its entirety.

Observing a target device's responses to tests and instrumentation vectors may be insufficient in assessing (or analyzing) the target device's design and/or implementation. The tests may cause the target device to send invalid (or improper) messages to other devices, even while the target device is still responding properly to the invalid test messages and instrumentation vectors. This is especially problematic when the target device is a part of a larger system of multiple devices because while the target device itself may not fail, it may nevertheless negatively affect the health of the system in the course of processing the tests.

For example, in a network using Open Shortest Path First (OSPF) routing protocol, a router under attack may improperly communicate with other routers and corrupt their routing tables, link state databases (LSDBs), and/or other shared resources. The router itself may still respond to attacks correctly. However, the other routers with contaminated routing tables, LSDBs, and/or other shared resources may fail or malfunction as a result of the attacks. As another example, an enterprise system may include a web server hosting web applications connected with a database server. Attacks sent to the web applications may corrupt data stored in the database server, even though the web applications may still appear normal.

From the above, there is a need for a system and method to test and analyze a target device to ensure that invalid traffic would not cause the target device to negatively affect the health of a system of which the target device is a member.

SUMMARY

The present invention provides a system and method for analyzing and/or testing member devices in a multi-device system. The multi-device system includes a device-under-analysis (DUA) and a device-under-observation (DUO). An analyzer that is external to the multi-device system generates and sends test messages to the DUA. The analyzer monitors the health of the multi-device system through the DUO and detects a system-wide impact of the DUA caused by the test messages. The analyzer analyzes the DUA based on the test messages and the system-wide impact.

Other aspects of the disclosure include software, systems, components, and methods corresponding to the above, and applications of the above for purposes other than analysis and testing.

BRIEF DESCRIPTION OF THE DRAWINGS

The disclosure is illustrated by way of example, and not by way of limitation, in the figures of the accompanying drawings in which like reference numerals refer to similar elements.

DETAILED DESCRIPTION

As described above, a defectively designed or implemented device can negatively affect the health of a system of which the device is a member. However, it is difficult to detect the negative effects in the system or to identify their causes. Therefore, what is needed is a system and method that can test and analyze a device by a) determining whether invalid traffic would cause the device to negatively affect the system to which it belongs and b) identifying the causes of the negative effects.

In the following description, test and analysis for implementation quality (e.g., security, conformance, interoperability, robustness) of a device are being performed. However, the description also applies to other types of device analysis and/or testing. "Device," "device-under-analysis," and "DUA" represent software and/or hardware. Software includes, for example, applications, operating systems, and/or communications systems (or subsystems). Hardware includes, for example, one or more devices. A device may be, for example, a mobile device (including a phone, personal digital assistant (PDA), or laptop), switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer.

System Architecture

Figure 1:
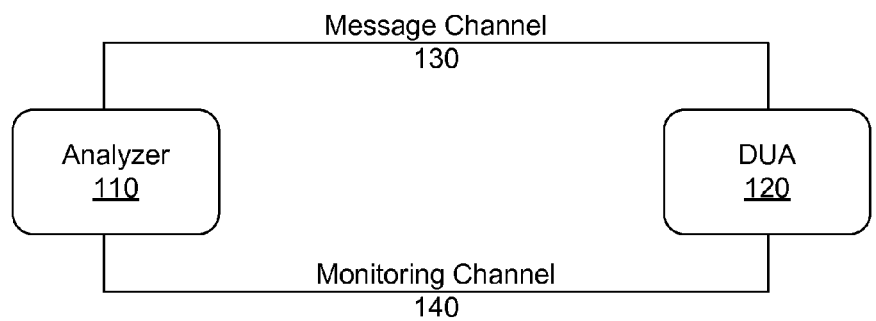
FIG. 1 illustrates a system that includes an analyzer and a device-under-analysis, according to one embodiment.

FIG. 1 is a high-level block diagram of a system 100 for testing and/or analyzing the implementation quality of a device-under-analysis according to one embodiment. The system 100 includes an analyzer 110 and a device-under-analysis (DUA) 120. The analyzer 110 and the DUA 120 are communicatively connected through a message channel 130 and a monitoring channel 140. The message channel 130 and the monitoring channel 140 can each use any type of data transmission mechanism, such as a network (wired or wireless). Examples of such a network include the Internet, an intranet, a wireless local area network (LAN), a cellular network, or any combination thereof. There may be devices located between the analyzer 110 and the DUA 120 on the message channel 130 or the monitoring channel 140, although FIG. 1 omits such devices for clarity.

The analyzer 110 includes hardware and/or software devices that are configured to test and/or analyze the implementation quality of the DUA 120. The DUA 120 includes hardware and/or software devices subject to the test and/or analysis. The analyzer 110 can execute test cases to test the implementation quality of the DUA 120. A test case can include one or more test messages that may expose an implementation flaw of the DUA 120. In one embodiment, the analyzer 110 generates and sends test messages to the DUA 120 and receives responses from the DUA 120 through the message channel 130. Detailed information and examples about the analyzer 110 and security tests for communication protocols may be found in U.S. application Ser. No. 11/351,403, filed on Feb. 10, 2006, the content of which is incorporated by reference in its entirety. The analyzer 110 can monitor the DUA 120 to determine its operation. In one embodiment, the DUA 120 outputs data that is sent to the analyzer 110 using the monitoring channel 140. In another embodiment, the analyzer 110 sends a command to the DUA 120 using the monitoring channel 140.

In one embodiment, the DUA 120 has capacity to execute a software application. For example, the DUA 120 can have a computer system supporting an embedded computing environment that can execute software applications. The computer system can include one or more processors, memories, network interfaces, and display interfaces. Examples of the computing environment include a Java Virtual Machine (JVM) and an operating system (e.g., Linux, Palm OS, Microsoft Windows Mobile). In one embodiment, the DUA 120 is a mobile phone running a JVM.

In one embodiment, the analyzer 110 and the DUA 120 are structured to include a processor, memory, storage, network interfaces, and applicable operating system and other functional software (e.g., network drivers, communication protocols).

Meta-Instrumentation

Figure 2:
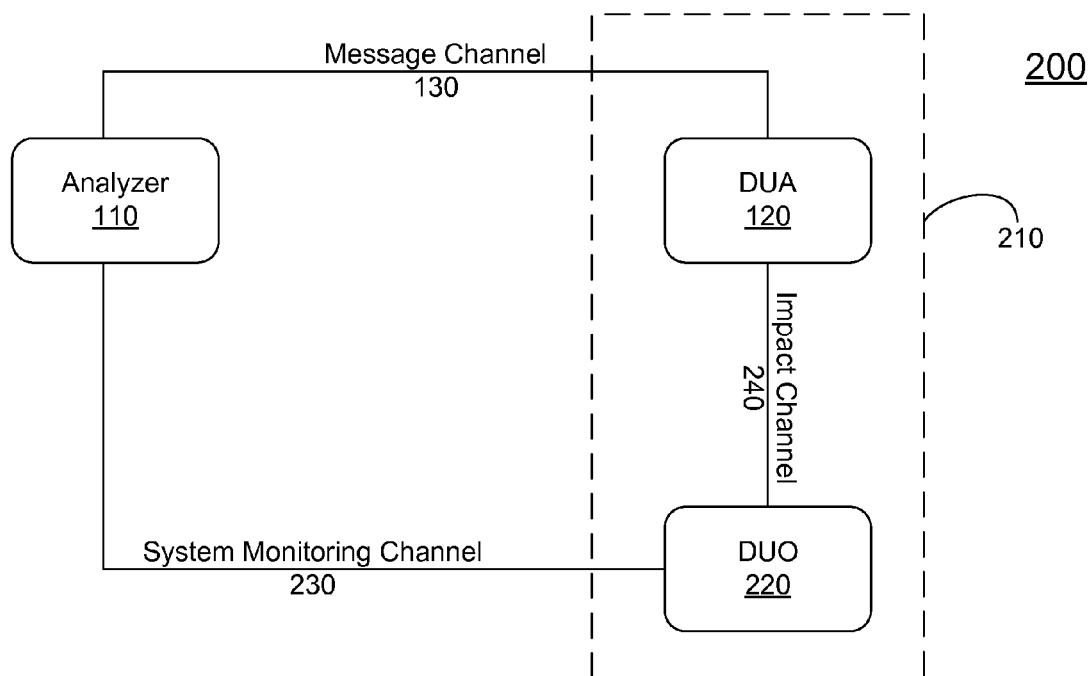
FIG. 2 illustrates a system that includes an analyzer and a multi-device system, the multi-device system including a device-under-analysis and a device-under-observation, according to one embodiment.

FIG. 2 is a high-level block diagram of a system 200 for testing and/or analyzing the implementation quality of member devices in a multi-device system according to one embodiment. Similar to the system 100, the system 200 also includes the analyzer 110 and the DUA 120, which are communicatively connected via the message channel 130. Unlike the system 100, in the system 200 the DUA 120 is a part of a multi-device system 210, which also includes a device-under-observation (DUO) 220.

The multi-device system 210 can include other member devices in addition to the DUA 120 and the DUO 220. The other member devices can have structure and/or capacity similar to the DUA 120 and/or the DUO 220. In one embodiment, any member device in the multi-device system 210 can be the DUA 120 or the DUO 220. Member devices of the multi-device system 210 may be alike (e.g., routers in a network) or dissimilar (e.g. firewalls, routers, web servers, etc.).

The DUO 220 includes hardware and/or software devices through which the analyzer 110 can monitor the health of the multi-device system 210. In one embodiment, similar to the DUA 120, the DUO 220 is structured to include a processor, memory, storage, network interfaces, and applicable operating system and other functional software (e.g., network drivers, communication protocols), and has capacity to execute a software application.

The DUO 220 and the analyzer 110 are communicatively connected through a system monitoring channel (or meta-instrumentation channel) 230. The DUA 120 and the DUO 220 are communicatively connected through an impact channel (or system channel) 240. Similar to the monitoring channel 140 in FIG. 1, the system monitoring channel 230 and the impact channel 240 can use any type of data transmission mechanism, such as a network (wired or wireless). The system monitoring channel 230, the impact channel 240, and the message channel 130 could all be logical connections sharing the same physical communication medium or could each have a dedicated communication medium. There may be devices located between the analyzer 110 and the DUA 120 on the message channel 130, between the analyzer 110 and the DUO 220 on the system monitoring channel 230, or between the DUA 120 and the DUO 220 over the impact channel 240. In one embodiment, as further described below, the DUA 120 is not located on the system monitoring channel 230.

The system monitoring channel 230 can be established using communication protocols (e.g., Ethernet, WiMAX, Wi-Fi, Bluetooth) and related parameters (e.g., security keys). These protocols and parameters can be identified in a configuration stored in the analyzer 110. Alternatively, they may be automatically detected by the analyzer 110.

In one embodiment, the DUA 120 may affect operations of the DUO 220. It is not necessary for the impact channel 240 to support direct communications between the DUA 120 and the DUO 220. For example, the DUA 120 may affect an intermediate device though the impact channel 240, which in turn affects the behavior of the DUO 220 through the impact channel 240. Therefore, the DUA 120 may affect the DUO 220 through the impact channel 240, even though the impact channel 240 does not support direct communications between the two.

The analyzer 110 can monitor the health of the multi-device system 210 through the DUO 220. As described above, the DUA 120 may negatively affect the health of the multi-device system 210 when under attack. The negative effects may be visible to the DUO 220 or even affect the operation of the DUO 220. For example, the DUA 120 may contaminate a system-wide variable (or shared data structure) of the multi-device system 210 (e.g., a routing table of a network). The DUO 220 can detect this contamination by periodically checking the system-wide variables. The contaminated system-wide variable may also cause the DUO 220 to malfunction. For example, a router may fail to deliver packets to their destinations if its routing table is contaminated.

The analyzer 110 can test and determine whether the DUA 120 may negatively affect the multi-device system 210 by sending test cases to the DUA 120 and monitoring the health of the multi-device system 210 through the DUO 220. The process of testing the DUA 120 and monitoring the health of the multi-device system 210 is called meta-instrumentation. Because the DUO 220 can detect impacts in the multi-device system 210 caused by the DUA 120 (hereinafter called "system-wide impacts of the DUA 120"), the analyzer 110 can detect the system-wide impacts of the DUA 120 caused by the test cases. The analyzer 110 can also transmit instrumentation vectors to the DUO 220 to monitor its behavior changes during the test.

The analyzer 110 can monitor (or detect or observe) the ongoing health of the multi-device system 210 through passive monitoring or active monitoring. Passive monitoring includes reviewing information made available by the DUO 220, while active monitoring includes executing commands or function calls in the DUO 220 in order to obtain specific information. As an example of active monitoring, the value of a system-wide variable can be checked by calling application program interfaces (APIs) supported by the DUO 220. As an example of passive monitoring, the outputs (e.g., logging file such as the syslog, outgoing communication such as console messages) of software applications (or constituent or dependent process or thread) running on the DUO 220 can be observed. In one embodiment, a monitor pattern feature is available. A monitor pattern is a regular expression designed to match keywords in fault messages generated by the DUO 220. In this embodiment, a monitor pattern is used to identify the fault messages.

In one embodiment, the analyzer 110 can analyze a detected system-wide impact of the DUA 120 to identify its cause. For example, the analyzer 110 can establish a baseline snapshot of a system-wide variable of the multi-device system 210 and/or the DUO 220's state when the DUA 120 is operating normally (e.g., before the analyzer 110 starts sending any test case to the DUA 120). The baseline snapshot thus serves as a general mechanism to detect system-wide impacts of the DUA 120. Subsequently, snapshots of the system-wide variable can be obtained periodically during test cases. The monitoring activity can be synchronous or asynchronous with respect to the test cases. If a later snapshot differs, it can be determined that at least one test case that occurred before that differing snapshot caused the system-wide impacts. As another example, if the DUO 220 malfunctions after a test case is sent to the DUA 120, it can be determined that the test case causes system-wide impacts, which in turn cause the DUO 220 to malfunction.

In one embodiment, the analyzer 110 can analyze the implementation quality of the DUA 120 based on the detected system-wide impacts of the DUA 120 and their causes. For example, the analyzer 110 can identify potential implementation defects in the DUA 120 based on the test cases causing system-wide impacts. In one embodiment, the analyzer 110 establishes a monitoring channel to the DUA 120 similar to the monitoring channel 140 illustrated in FIG. 1 to observe the DUA 120's responses to the test cases. In this embodiment, the analyzer 110 can analyze the implementation quality of the DUA 120 based on its responses to the test cases and the detected system-wide impacts.

In one embodiment, the analyzer 110 keeps a fault log and creates an entry in the log when it discovers a system-wide impact or a fault (or fault condition, internal failure) of a member device of the multi-device system 210 during an analysis. In one embodiment, an entry contains various pieces of information, such as when the system-wide impact or fault was discovered, which system-wide variable is affected, and which test message (or range or group of messages) caused the system-wide impact or fault.

In one embodiment, the analyzer 110 interacts with the DUO 220 using a communication protocol different from the one the analyzer 110 uses to interact with the DUA 120. In one embodiment, the analyzer 110 can monitor system-wide impacts of the DUA 120 through the DUA 120 itself using a monitoring channel with a communication protocol and/or a physical interface different from the one for sending test cases. In another embodiment, the analyzer 110 can monitor the health of the multi-device system 210 through multiple member devices.

In one embodiment, the analyzer 110, the DUA 120, and/or the DUO 220 can be stored and operated on a single computer or on separate computer systems communicating with each other through a network.

Meta-Instrumentation Mechanism

Sometimes a test case can cause a DUA to negatively affect the health of a system of which the DUA is a member device. If this happens, the DUA may still respond to the test case and subsequent test cases properly, even though the negative effects may cause other member devices of the system to fail.

In one embodiment, the analyzer 110 can test the DUA while monitoring the ongoing health of the system and detecting any negative effect in the system caused by the DUA (e.g., through another member device of the system).

Figure 3:
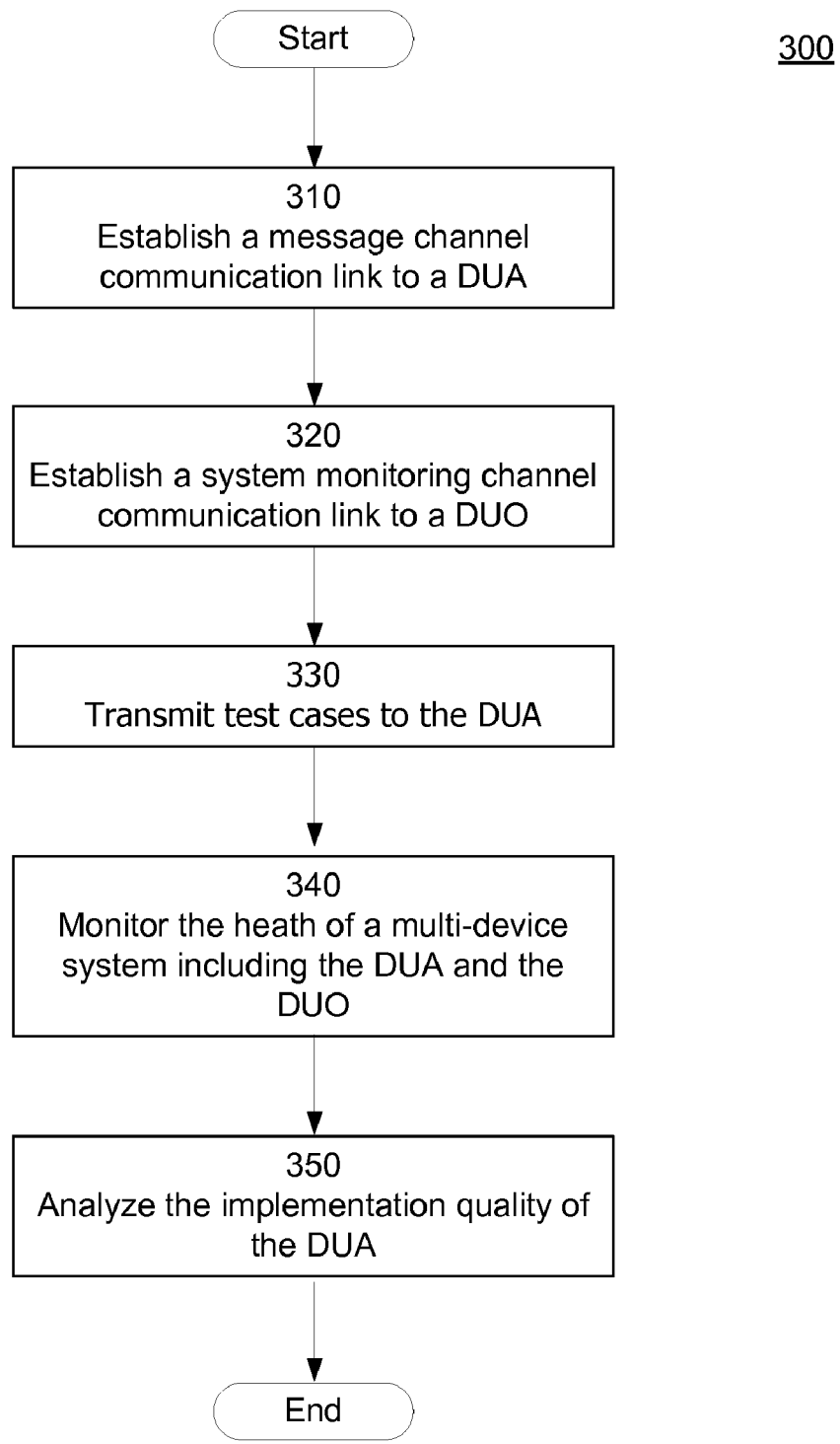
FIG. 3 illustrates a flowchart of a method for testing and analyzing the implementation quality of a device-under-analysis, according to one embodiment.

FIG. 3 is a flowchart of a method 300 for testing and analyzing the implementation quality of a DUA 120 in a multi-device system 210 in accordance with one embodiment. The method 300 can be implemented and performed by the system 200. An example of the DUA 120 and the multi-device system 210 is a router and a network within which the router resides.

The method 300 begins when a communication link (the message channel 130 communication link) is established 310 between the analyzer 110 and the DUA 120 through the message channel 130. This establishment can be initiated by the analyzer 110 or the DUA 120. For example, the analyzer 110 can be configured with a network address of the DUA 120 and supported communication protocols and can use this information to establish 310 the message channel 130 communication link. Alternatively, the analyzer 110 can be configured to discover and connect to the DUA 120 following a bootstrap/discovery procedure.

A communication link (the system monitoring channel 230 communication link) is established 320 between the analyzer 110 and the DUO 220 through the system monitoring channel 230. A communication protocol of the system monitoring channel 230 communication link can be different from a communication protocol of the message channel 130 communication link. The system monitoring channel 230 communication link can be established 320 before, simultaneously as, or after the message channel 130 communication link is established 310.

In one embodiment, the system monitoring channel 230 communication link does not pass through the DUA 120. The analyzer 110 puts the DUA 120 under attack to determine whether it negatively affects the health of the multi-device system 210. As a result, the DUA 120 may not be stable. Therefore, the system monitoring channel 230 communication link, the channel for the analyzer 110 to monitor the ongoing health of the multi-device system 210, should not depend on the DUA 120.

The analyzer 110 transmits (or sends) 330 tests cases to the DUA 120 through the message channel 130 communication link. In one embodiment, the analyzer 110 can generate (or create) the test cases by generating test messages based on the information about the DUA 120 (e.g., supported communication protocols, software and/or hardware configuration). For example, the analyzer 110 can generate test cases targeted to test the communication protocols used to establish the message channel 130 communication link. Alternatively, the analyzer 110 can reuse existing test cases and transmit 330 them to the DUA 120.

In one embodiment (not shown), the analyzer 110 establishes a baseline snapshot of system-wide variables of the multi-device system 210 and/or a state of the DUO 220 (or other member devices of the multi-device system 210) before transmitting 330 the test cases to the DUA 120.

In one embodiment, only one member device of the multi-device system 210, the DUA 120, is placed under attack at a time. The other member devices, because they are not under attack, are presumed to function properly. Therefore, if the analyzer 110 detects any change in the multi-device system 210 that negatively affects the health of the multi-device system 210 during the test cases, it can be determined that the DUA 120 caused the change.

The analyzer 110 monitors (or detects or observes) 340 the health of the multi-device system 210 through the system monitoring channel 230 communication link. For example, the analyzer 110 can periodically establish snapshots of the system-wide variables (e.g., data structures shared among member devices). As another example, the analyzer 110 can monitor 340 the operation or state of member devices of the multi-device system 210 (e.g., the DUO 220).

As described above with respect to FIG. 2, the analyzer 110 can monitor 340 actively and/or passively. Passive monitoring includes reviewing information made available by the DUO 220 and/or other member devices, while active monitoring includes executing commands or function calls in the DUO 220 or other member devices in order to obtain specific information.

As an example of active monitoring, the analyzer 110 can periodically (e.g., once per second or once per test case) establish a snapshot of system-wide variables by sending a query to the DUO 220 (or requesting the DUO 220 to send the query to a data source hosting the system-wide variables) for the system-wide variables. The DUO 220 will respond by providing information about the system-wide variables (e.g., current value, last update time) to the analyzer 110. Alternatively, the analyzer 110 can set a trigger in the DUO 220 (or another member device) for a system-wide variable, such that the DUO 220 will report to the analyzer 110 when the system-wide variable is updated, or when an attempt to update the system-wide variable was made, or when a state of the DUO 220 is reached or changed. The trigger may also enable the DUO 220 to periodically report information about its state and/or operations to the analyzer 110.

As an example of passive monitoring, the analyzer 110 can passively observe the outputs of the DUO 220 and match the observed outputs with monitor patterns to identify messages about events of interest, such as operation failure, internal state change, etc. For example, when testing a multi-device system comprising routers in a network supporting the OSPF routing protocol, the analyzer 110 can passively observe the output (and/or input) of a router for messages updating the LSDB.

In one embodiment, the analyzer 110 monitors 340 the operation or state of the DUO 220 (or other member devices of the multi-device system 210) by sending instrumentation vectors to the DUO 220 and observing its responses to the instrumentation vectors. The goal of the instrumentation vectors is for the analyzer 110 to monitor operations of the DUO 220 and identify any faults (or fault conditions, internal failures) in the DUO 220. The instrumentation vectors sent to the DUO 220 may be of the same communication protocol as the test cases transmitted 330 to the DUA 120, or of a different communication protocol.

In one embodiment, the instrumentation vectors can be of multiple communication protocols. For example, in a network supporting the OSPF routing protocol and the Multi-protocol Label Switching (MPLS) switching protocol, invalid MPLS packets may cause topology changes that may affect routers supporting the OSPF routing protocol. Therefore, the analyzer 110 can send test messages to a first router (the DUA 120) using the MPLS switching protocol, and use an OSPF connection to a second router (the DUO 220) to observe whether the LSDB or the routing table is changed by the test messages sent to the first router against its MPLS layer. If the LSDB or the routing table changes, the analyzer 110 can determine that the particular test messages caused incorrect behavior in the first router.

In one embodiment, the analyzer 110 monitors 340 the operation or state of the DUO 220 through an internal agent residing inside the DUO 220. The internal agent can monitor the internal state changes and operations of the DUO 220 caused by the DUA 120 responding to the test cases. Detailed information and examples about the internal agent may be found in U.S. application Ser. No. 11/696,605, filed on Apr. 4, 2007, the content of which is incorporated by reference in its entirety.

The analyzer 110 analyzes 350 the implementation quality of the DUA 120 based on information it monitored through the system monitoring channel 230 communication link. For example, the analyzer 110 can execute a fault isolation algorithm to identify particular test cases transmitted to the DUA 120 that negatively affect the health of the multi-device system 210. For example, the analyzer 110 can compare snapshots taken during test cases to identify changes. The analyzer 110 determines whether the identified changes in the snapshots are valid. For example, if the routing table of a network is changed and there is no topology change for the network, it can be determined that the change is invalid. If the analyzer 110 determines that invalid changes have happened, it can infer that the test cases caused incorrect behavior in the DUA 120.

The analyzer 110 can analyze 350 the implementation quality of the DUA 120 using various information (e.g., information obtained through active or passive monitoring). In one embodiment, the analyzer 110 can monitor the state and/or operation of the DUA 120 by establishing a monitoring channel to the DUA 120 similar to the monitoring channel 140 in FIG. 1, and conduct analysis based on this information. The analyzer 110 may be configured to conduct analysis on a fixed interval schedule or conduct analysis at the end of each test case or each set of test cases.

Based on the result of the analysis, the analyzer 110 can transmit 330 more test cases to the DUA 120 (or another member device of the multi-device system 210), conduct further analysis 350, or generate a report summarizing its findings.

The embodiments described herein beneficially use a first member device of a system to observe the health of the system while testing a second member device. Therefore, the embodiments can conduct output validation of the second member device by determining whether it negatively affected the system when under test. The embodiments can also identify test case(s) causing incorrect behavior in the member devices.

This disclosed system and method can be applied to a wide field of devices (including wireless devices and battery-powered devices) and using various types of testing and/or analysis (e.g., security, conformance, interoperability, robustness).

In the preceding description, for purposes of explanation, numerous specific details are set forth in order to provide a thorough understanding of the disclosure. It will be apparent, however, to one skilled in the art that the disclosure can be practiced without these specific details. In other instances, structures and devices are shown in block diagram form in order to avoid obscuring the disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, objects, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present disclosure also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems appears in the description herein. In addition, the present disclosure is not described with reference to any particular programming language. It will be appreciated that a variety of programming languages may be used to implement the teachings of the disclosure as described herein.

What is claimed is:

1. A method for testing and analyzing a security vulnerability of a multi-device network system to protocol abuse of a network communications protocol, the method implemented by a security analyzer device, comprising:
    establishing a first communication link between a member network device-under-analysis (DUA) of the multi-device network system and the security analyzer device;
    establishing a second communication link between a member network device-under-observation (DUO) of the multi-device network system and the security analyzer device, the DUA and the DUO being distinct member devices of the multi-device network system;
    attacking the DUA multiple times, the attacks comprising sending to the DUA through the first communication link test messages that are invalid with respect to the network communication protocol;
    during and after attacking the DUA, monitoring, with the security analyzer, outputs from the DUO received over the second communication link;
    determining, based on the outputs received from the DUO, whether the multi-device network system includes a security vulnerability;
    responsive to a determination that the multi-device network system includes a security vulnerability, based on the outputs received from the DUO, identifying which attack causes the security vulnerability.

2. The method of claim 1, wherein the security analyzer device is not a member device of the multi-device network system, and wherein determining whether the multi-device network system includes a security vulnerability comprises (1) determining whether the attacks cause a system-wide impact through the DUA in the multi-device network system and (2) determining whether the system-wide impact comprises a security vulnerability.

3. The method of claim 2, wherein the system-wide impact comprises a change or an attempt to change a system-wide variable.

4. The method of claim 3, wherein the system-wide variable comprises at least one selected from a group consisting of a routing table and a shared database.

5. The method of claim 2, wherein the system-wide impact comprises a malfunction in a member network device of the multi-device network system.

6. The method of claim 1, wherein a communication protocol of the first communication link is different from a communication protocol of the second communication link.

7. The method of claim 1, further comprising:
    monitoring responses of the DUA to the attacks, wherein determining whether the multi-device network system includes a security vulnerability further comprises analyzing the DUA based on the responses.

8. The method of claim 1, further comprising:
    generating the attacks based on one of the following information: a supported communication protocol of the DUA, a software configuration of the DUA, and a hardware configuration of the DUA.

9. The method of claim 1, wherein the second communication link does not pass through the DUA.

10. A computer program product for testing and analyzing a security vulnerability of a multi-device network system to protocol abuse of a network communications protocol, the method implemented by a security analyzer device, the computer program product comprising a computer-readable medium containing computer program code for performing a method comprising: establishing a first communication link between a member network device-under-analysis (DUA) of the multi-device network system and the security analyzer device;
    establishing a second communication link between a member network device-under-observation (DUO) of the multi-device network system and the security analyzer device, the DUA and the DUO being distinct member devices of the multi-device network system;
    attacking the DUA multiple times, the attacks comprising sending to the DUA through the first communication link test messages that are invalid with respect to the network communication protocol;
    during and after attacking the DUA, monitoring, with the security analyzer, outputs from the DUO received over the second communication link;
    determining, based on the outputs received from the DUO, whether the multi-device network system includes a security vulnerability;

responsive to a determination that the multi-device network system includes a security vulnerability, based on the outputs received from the DUO, identifying which attack causes the security vulnerability.

11. The computer program product of claim 10, wherein the security analyzer device is not a member device of the multi-device network system, and wherein determining whether the multi-device network system includes a security vulnerability comprises (1) determining whether the attacks cause a system-wide impact through the DUA in the multi-device network system and (2) determining whether the system-wide impact comprises a security vulnerability.

12. The computer program product of claim 11, wherein the system-wide impact comprises a change or an attempt to change a system-wide variable.

13. The computer program product of claim 11, wherein the system-wide impact comprises a malfunction in a member network device of the multi-device network system.

14. The computer program product of claim 10, wherein the system-wide variable comprises at least one selected from a group consisting of a routing table and a shared database.

15. The computer program product of claim 10, wherein a communication protocol of the first communication link is different from a communication protocol of the second communication link.

16. The computer program product of claim 10, wherein the method further comprises: monitoring responses of the DUA to the attacks, wherein determining whether the multi-device network system includes a security vulnerability further comprises analyzing the DUA based on the responses.

17. The computer program product of claim 10, wherein the method further comprises: generating the attacks based on one of the following information: a supported communication protocol of the DUA, a software configuration of the DUA, and a hardware configuration of the DUA.

18. The computer program product of claim 10, wherein the second communication link does not pass through the DUA.

19. A security analyzer device for testing and analyzing a security vulnerability of a multi-device network system to protocol abuse of a network communications protocol, comprising:
 a computer processor configured to execute computer program instructions; and
 a computer-readable storage medium having executable computer program instructions tangibly embodied thereon, the executable computer program configured to cause the computer processor to perform the steps of:
 establishing a first communication link between the DUA and an analyzer, wherein the analyzer is external to the DUA;
 establishing a second communication link between a device-under-observation (DUO) and the analyzer, the DUA and the DUO being distinct member devices of a multi-device system;
 transmitting to the DUA via the first communication link a test case including a message which is malformed or invalid with respect to the network communications protocol;
 monitoring via the second communication link a system-wide impact of the DUA in the multi-device system caused by the test case; and
 analyzing whether the DUA has a security vulnerability based on the test case and the system-wide impact.

20. A security analyzer device for testing and analyzing a security vulnerability of a multi-device network system to protocol abuse of a network communications protocol, comprising:
 a computer processor configured to execute computer program instructions; and
 a computer-readable storage medium having executable computer program instructions tangibly embodied thereon, the executable computer program configured to cause the computer processor to perform the steps of:
 establishing a first communication link between the DUA and an analyzer, wherein the analyzer is external to the DUA;
 establishing a second communication link between a device-under-observation (DUO) and the analyzer, the DUA and the DUO being distinct member devices of a multi-device system;
 transmitting to the DUA via the first communication link a test case;
 monitoring via the second communication link a system-wide impact of the DUA in the multi-device system caused by the test case; and
 analyzing the DUA based on the test case and the system-wide impact,
 wherein the security analyzer device is not a member device of the multi-device network system, and wherein determining whether the multi-device network system includes a security vulnerability comprises (1) determining whether test case causes a system-wide impact through the DUA in the multi-device network system and (2) determining whether the system-wide impact comprises a security vulnerability.

* * * * *